United States Patent
Mizunuma et al.

(10) Patent No.: US 7,754,117 B2
(45) Date of Patent: Jul. 13, 2010

(54) SHEET FORMING APPARATUS AND METHOD OF CONTROLLING THE SAME

(75) Inventors: Koji Mizunuma, Sunto-gun (JP); Yasutaka Matsumura, Fuji (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 783 days.

(21) Appl. No.: 11/465,370

(22) Filed: Aug. 17, 2006

(65) Prior Publication Data

US 2007/0045885 A1    Mar. 1, 2007

(30) Foreign Application Priority Data

Aug. 23, 2005    (JP) .............................. 2005-241674

(51) Int. Cl.
B29C 43/24    (2006.01)
B29C 43/58    (2006.01)

(52) U.S. Cl. .................. 264/40.7; 264/40.5; 264/173.1; 264/175; 425/141; 425/149; 425/150; 425/367

(58) Field of Classification Search ................. 425/367, 425/141, 149, 150, 365; 264/40.5, 40.7, 264/173.1, 175
See application file for complete search history.

(56) References Cited

U.S. PATENT DOCUMENTS

| | | | | |
|---|---|---|---|---|
| 3,531,827 A | * | 10/1970 | Dragonette | ................. 425/141 |
| 3,599,288 A | | 8/1971 | Eakman | |
| 4,214,857 A | * | 7/1980 | Woeckener et al. | ......... 425/141 |
| 4,319,947 A | | 3/1982 | Tokuno | |
| 4,810,179 A | * | 3/1989 | Cavanagh | ................... 425/141 |
| 5,158,724 A | * | 10/1992 | Yagi et al. | ................. 264/40.1 |
| 5,262,101 A | | 11/1993 | Yagi et al. | |
| 5,433,897 A | * | 7/1995 | Kanome et al. | ............ 264/1.33 |
| 5,456,871 A | * | 10/1995 | Harada et al. | .............. 264/40.1 |
| 6,250,904 B1 | * | 6/2001 | Reddy et al. | ................. 425/135 |
| 6,863,517 B2 | * | 3/2005 | Nissel | ........................ 425/141 |

FOREIGN PATENT DOCUMENTS

| | | |
|---|---|---|
| CN | 1076652 A | 9/1993 |
| JP | 09-155948 | 6/1997 |
| JP | 10-34748 | 2/1998 |

OTHER PUBLICATIONS

Chinese Office Action issued Jul. 25, 2008 in the counterpart Chinese Patent Application No. 200610084845.9.
English language translation of the Chinese Office Action issued on Jul. 25, 2008 in the counterpart Chinese Patent Application No. 200610084845.9.

(Continued)

*Primary Examiner*—Joseph S Del Sole
*Assistant Examiner*—Robert Dye
(74) *Attorney, Agent, or Firm*—DLA Piper LLP (US)

(57) ABSTRACT

The present invention enables an automatic roll gap adjustment, thereby facilitating operations at a set-up or when changing forming conditions. Specifically, one embodiment of the present invention controls a sheet take-off speed (a roll rotation speed) in accordance with a deviation of a measurement value from a set value of a roll gap under a constant pressing load control.

5 Claims, 3 Drawing Sheets

OTHER PUBLICATIONS

Office Action issued in U.S. Appl. No. 11/419,655 mailed Feb. 3, 2009.
English Abstract of JP 09-155948, Jun. 17, 1997.
English Abstract of JP 10-034748, Feb. 10, 1998.
English Language machine translation of JP 09-155948, Jun. 17, 1997.
English Language machine translation of JP 10-0347748, Feb. 10, 1998.
Chinese Office Action issued in CN 200610084845.9 on Jul. 3, 2009.
English Translation of Chinese Office Action issued in CN 200610084845.9 on Jul. 3, 2009.
Office Action issued in U.S. Appl. No. 11/419,655 on Oct. 19, 2009.
Notice of Allowance issued in U.S. Appl. No. 11/419,655 on Mar. 9, 2010.

* cited by examiner

SHEET FORMING APPARATUS AND METHOD OF CONTROLLING THE SAME

CROSS REFERENCE TO RELATED APPLICATION

This application claims the benefit of priority under 35 U.S.C. §119 to Japanese Patent Application No. 2005-241674, filed on Aug. 23, 2005, the entire content of which is incorporated by reference herein.

BACKGROUND OF THE INVENTION

1. Field of the Invention

This invention relates to a sheet forming apparatus and a method of controlling the same, specifically to a sheet forming apparatus employing a touch roll, which allows a sheet to go through between two rolls in such a manner that the front face and the back face thereof are abutting the rolls, respectively, thereby to form a sheet, and a method of controlling such a sheet forming apparatus.

2. Description of the Related Art

As a sheet forming apparatus relying on an extrusion molding method, there is an apparatus that has two rolls disposed in parallel with each other, leaving a gap therebetween, wherein a sheet (a molten resin from a T die) goes through between the two rolls that are driven to rotate while the front and the back face of the sheet are abutting the rolls, respectively. (See Japanese Patent Application Laid-open Publications Nos. H09-155948 and H10-34748.)

In a related art sheet forming apparatus, a wedge member is inserted between two roll supporting housings (bearing housings) that respectively support the two rolls and one of the roll supporting housings is pressed onto the other housing by use of an oil-pressure cylinder apparatus, wherein a roll gap is controlled through an insertion depth of the wedge member into between the two roll supporting housings.

In this sheet forming apparatus, since the wedge member is inserted between the two roll supporting housings, it is impossible to measure quantitatively the force (load) applied onto a sheet being formed, but only possible to maintain the roll gap constant.

When an extrusion amount of a molten resin from a T die is increased at the time of starting an operation (or changing forming conditions), the roll gap has to be widened. However, if it is delayed for the gap to be widened, there is formed a larger melt bank on the upper roll. An abnormally large melt bank overloads a roll driving motor, or may cause surface defects such as bank marks and the like. In addition, the molten resin of the melt bank adheres on a T die lip and smears the same.

On the other hand, when an extrusion amount of a molten resin from a T die is decreased at the time of starting an operation (or changing forming conditions), the roll gap has to be narrowed. However, if it is delayed for the gap to be narrowed, the rolls do not touch a sheet being formed. In this case, the sheet is not cooled sufficiently by the rolls. Therefore, the sheet is no longer hardened enough, thereby resulting in a soft sheet, which may allow such a sheet to leave of from the rolls at the lower portion thereof and to fall down.

In the past, the roll gap has been manually adjusted by an operator of such a forming apparatus. Namely, he or she adjusts the roll gap through observation of a size of the melt bank while controlling the extruding machine and a line speed. As stated above, if the roll gap is excessively wide, the sheet cannot be cooled enough and a part thereof hangs down to be wound around the roll. On the other hand, if the roll gap is excessively narrow, the melt bank grows large, which causes surface defects such as bank marks on the sheet and overloads the roll driving motor into halt. Therefore, the forming apparatus needs to be continuously adjusted by the operator.

In the past, there has once been employed a method in which a sheet take-off speed is changed simply in proportion to a rotation speed of a screw of the extruding machine, which is known as a so-called simple proportion operation. In this method, an extrusion amount of a molten resin from the extruding machine is adjusted in retard of a change in the rotation speed of the screw. Therefore, when the rotation speed changes quickly, the roll gap changes before the extrusion amount changes in accordance with the speed change, which leads to such troubles of sheet hanging, motor overload, or the like. This makes it almost impossible to change the screw speed quickly.

SUMMARY OF THE INVENTION

The objective of the present invention is to realize an automatic adjustment of the roll gap and the sheet take-off speed, thereby facilitating operation at the time of starting and changing forming conditions.

A first aspect of the present invention provides a sheet forming apparatus equipped with two rolls arranged in parallel with each other leaving a gap therebetween, wherein a sheet goes through between the two rolls driven to rotate while the front face and the back face thereof are abutting the rolls, respectively. This sheet forming apparatus comprises a roll gap adjustment means configured to displace at least one of the two rolls thereby to increase or decrease a roll gap between the two rolls; a roll gap control means configured to perform a constant pressing load control in which the roll gap is adjusted by the roll gap adjustment means so that a pressing load acting on at least one of the two rolls becomes a predetermined target control value; and a sheet take-off speed control means configured to control a sheet take-off speed in accordance with a deviation of a measurement value of the roll gap from a set value under the constant pressing load control by the roll gap control means.

A second aspect of the present invention provides a sheet forming apparatus equipped with two rolls arranged in parallel with each other leaving a gap therebetween, wherein a sheet goes through between the two rolls driven to rotate while the front face and the back face thereof are abutting the rolls, respectively. This sheet forming apparatus comprises a roll gap adjustment means configured to displace at least one of the two rolls thereby to increase or decrease a roll gap between the two rolls; a roll gap measurement means configured to measure the roll gap; a pressing load measurement means configured to measure a pressing load acting on at least one of the two rolls; a roll gap control means configured to perform a constant pressing load control in which the roll gap is adjusted by the roll gap adjustment means so that a deviation of a measurement value measured by the pressing load measurement means from a target control value of the pressing load becomes zero, and a sheet take-off speed control means configured to control a sheet take-off speed in accordance with a deviation of a measurement value measured by the roll gap measurement means from a predetermined value of the roll gap under the constant pressing load control by the roll gap control means.

In the sheet forming apparatus according to the first and the second aspect, it is preferable that the roll gap control means is provided with two modes of operation, one mode being a constant pressing load control mode that performs the constant pressing load control and another mode being a constant roll gap control mode that adjusts the roll gap by use of the roll gap adjustment means so that the roll gap between the two rolls become a predetermined target control value, wherein the roll gap is controlled by the constant pressing load control mode when starting of sheet forming or changing of forming conditions and the control mode is switched to the constant roll gap control mode to control the roll gap.

A third aspect of the present invention provides a method of controlling a sheet forming apparatus equipped with two rolls arranged in parallel with each other leaving a gap therebetween, wherein a sheet goes through between the two rolls driven to rotate while the front face and the back face thereof are abutting the rolls, respectively. This method comprises performing a constant pressing load control in which a roll gap between the two rolls is adjusted so that a pressing load acting on at least one of the two rolls becomes a predetermined target control value, and controlling a sheet take-off speed in accordance with a deviation of a measurement value of the roll gap from a set value under the constant pressing load control.

A fourth aspect of the present invention provides a method of controlling a sheet forming apparatus equipped with two rolls arranged in parallel with each other leaving a gap therebetween, wherein a sheet goes through between the two rolls driven to rotate while the front face and the back face thereof are abutting the rolls, respectively. This method comprises performing a constant pressing load control that adjusts a roll gap between the two rolls so that a pressing load acting on at least one of the two rolls becomes a predetermined target control value when starting of sheet forming or changing of forming conditions so as to control a sheet take-off speed in accordance with a deviation of a measurement value of the roll gap from a set value under the constant pressing load control, and performing a constant roll gap control in which the roll gap is adjusted so that the roll gap becomes a predetermined target control value.

In the method of controlling the sheet forming apparatus, it is preferable that a relation between an extrusion amount of a molten resin from an extruding machine as a molten resin supplier and the pressing load in the constant pressing load control is determined in advance and a target control value of the pressing load in the constant pressing load control in accordance with a change in an extrusion amount.

In the sheet forming apparatus according to the present invention, while the constant pressing load control mode that adjusts the roll gap so that the pressing load acting on at least one of the rolls becomes a target control value is performed, the sheet take-off speed is controlled in accordance with a deviation of a measurement value from a predetermined value of the roll gap. Therefore, the roll gap and the sheet take-off speed are automatically controlled when changing an extrusion amount, which makes it possible to form an appropriate size of melt bank under an appropriate pressing load even when the sheet forming conditions are changed.

Therefore, there will be eliminated long-existing disadvantages that a soft, less hardened sheet is separated apart below the rolls and falls down or that the melt bank grows so large as to cause surface defects on the sheet or overload on the roll driving motor, thereby facilitating operations including a set-up and an alteration of sheet forming conditions.

DESCRIPTION OF PREFERRED EMBODIMENTS

Figure 1:
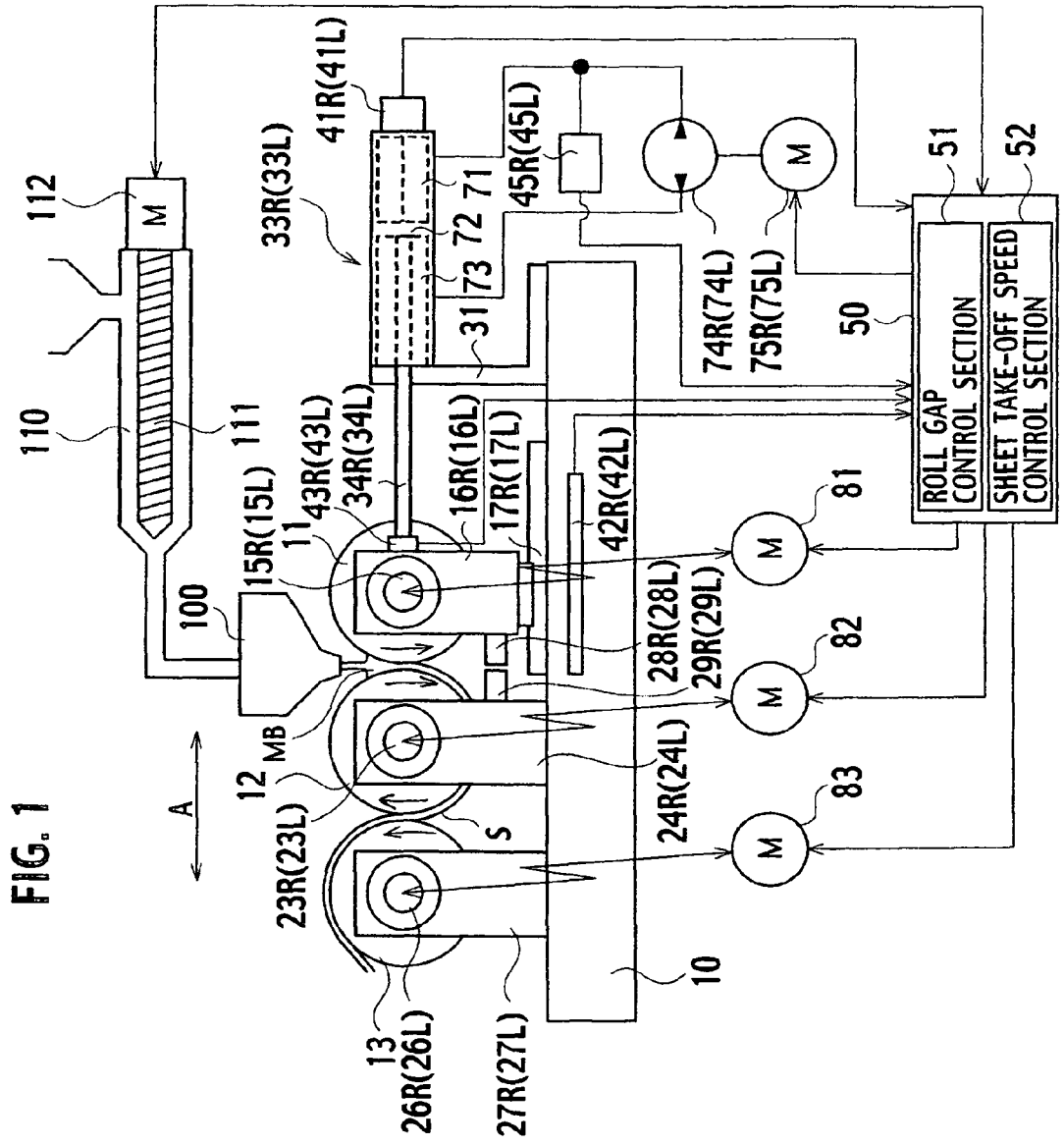
FIG. 1 is a schematic diagram of a sheet forming apparatus according to one embodiment of the present invention.

Referring to FIG. 1, there will be described a sheet forming apparatus according to one embodiment of the present invention.

A sheet forming apparatus is provided with a first roll 11, a second roll 12, and a third roll 13, all of which are on a stable base 10. The first roll 11, the second roll 12, and the third roll 13 are arranged side by side (in parallel) with one another.

The first roll 11 is rotatably supported at a left end portion 15L of a shaft thereof and a right end portion 15R of the shaft thereof by a left bearing housing 16L and a right bearing housing 16R, thereby being rotatable around a center axis line thereof. The bearing housings 16R, 16L are displaceably engaged with a right linear guide 17R and a left linear guide 17L provided on the stable base 10. This makes it possible for the first roll 11 to displace along a direction A in relation to the second roll 12 so as to increase or decrease a roll gap therebetween. Namely, a position of the first roll 11 can shift (change) in the direction A that allows the roll gap to change with respect to the second roll 12.

The second roll 12 is rotatably supported at a left end portion 23L of a shaft thereof and a right end portion 23R of the shaft by a left bearing housing 24L and a right bearing housing 24R that are fixedly provided on the stable base 10, thereby being rotatable around a center axis line thereof.

The third roll 13 is rotatably supported at a left end portion 26L of a shaft thereof and a right end portion 26R of the shaft thereof by a left bearing housing 27L and a right bearing housing 27R that are fixedly provided on the stable base 10, thereby being rotatable around a center axis line thereof. By the way, the third roll 13 can displace (change) along the direction A that allows the roll gap to change with respect to the second roll 12, as is the case with the roll 11. The position of the third roll 13 may be adjusted by a roll gap adjustment means which is substantially the same as a roll gap adjustment means to used for the first roll 11 (described later).

On the stable base 10, there are mounted a left oil pressure cylinder device 33L and a right oil pressure cylinder device 33R by a mounting member 31. Piston rods 34R, 34L of the oil pressure cylinder devices 33R, 33L are fixedly connected at each distal end thereof to the bearing housings 16R, 16L via load cells 43R, 43L.

The load cells 43R, 43L, which are a pressing load measurement means, are located where the end portion of the piston rods 34R, 34L and the bearing housings 16R, 16L are linked. The load cells 43R, 43L measure pressing load acting on the first roll 11.

The oil pressure cylinder devices 33R, 33L are of double-acting type having cylinder chambers 72, 73 on both sides of each piston 71 and serve as a roll gap adjustment means. Namely, the oil pressure cylinder devices 33R, 33L displace the position of the first roll 11 so as to increase or decrease the roll gap. The oil pressure cylinder devices 33R, 33L apply oil pressure respectively on the right bearing housing 16R and the left bearing housing 16L, thereby displacing the housings 16R, 16L respectively in the direction A to increase or decrease the roll gap.

Pressure oil for the oil pressure cylinder devices 33R, 33L is served to or returned from the cylinder chambers 72, 73 thereof by two-way pumps 74R, 74L driven respectively by servomotors 75R, 75L.

The oil pressure cylinder devices 33R, 33L have displacement gauges (position sensors) 41R, 41L built-in. The displacement gauges 41R, 41L serve to locate a position of the piston in the oil pressure cylinder devices 33R, 33L, thereby serving as a position locater of the first roll 11 and furthermore as a roll gap measurement means that measures the roll gap between the first roll 11 and the second roll 12 that is fixedly arranged.

On the stable base 10 are mounted displacement gauges (linear scales) 42R, 42L that detect respectively a position of the left and the right bearing housing 16R, 16L. The displacement gauges 42R, 42L serve as a roll gap measurement means that measures the roll gap between the first roll 11 and the fixedly arranged second roll 12 by locating the bearing housings 16R, 16L.

In some embodiments, the roll gap measurement means, may include either the displacement gauges 41R, 41L, which are built-in in the oil pressure cylinders, or the displacement gauges 42R, 42L, which are located in the bearing portion. When the displacement gauges 41R, 41L are employed to compose the roll gap measurement means, use of an oil pressure cylinder device having a displacement gauge built-in can reduce the number of components or members. On the other hand, when the displacement gauges 42R, 42L are employed, the roll gap is measured at a higher precision without being affected by deformation of connection portions where the piston rods 34R, 34L are connected to the bearing housings 16R, 16L. Which to choose depends on specification requirements.

Alternatively, both the displacement gauges 41R, 41L built-in in the oil pressure cylinder and the displacement gauges 42R, 42L in the bearing portion may be employed. In this case, the displacement gauges 41R, 41L built-in in the oil pressure cylinder are utilized in the first place since responsive and stable control is expected. In addition, the displacement gauges 42R, 42L, which are located closely to the roll thereby to provide data straightforwardly, are used to measure the roll gap, secondarily. Then, the measurement value by the displacement gauges 41R, 41L is compensated with that measured by the displacement gauges 42R, 42L.

By the way, the pressing load measurement means may be composed of pressure sensors 45R, 45L that measure a pressure of oil in the oil pressure cylinder devices 33R, 33L, instead of the load cells 43R, 43L.

The first roll 11, the second roll 12, and the third roll 13 are coupled respectively with electric motors 81, 82, 83 for rotating the rolls so that the first roll 11 and the third roll 13 rotate counterclockwise and the second roll 12 rotates clockwise.

Peripheral velocity of the first roll 11, the second roll 12, and the third roll 13 determines a sheet take-off speed. Therefore the sheet take-off speed can be controlled by controlling a rotation speed of the electric motors 81, 82, 83. In this embodiment, while a rotation speed of the second roll 12 (the electric motor 82) is set as a reference speed, rotation speeds of the first roll 11 (the electric motor 81) and the third roll 13 (the electric motor 83) are controlled to determine the sheet take-off speed, or a draw speed.

Above the roll gap between the first roll 11 and the second roll 12 is provided a long T die 100. Molten resin is supplied to the T die 100 from an extruding machine 110 including a screw 111 driven to rotate by a screw driving motor 112. The extruding machine 110 serves as a molten resin supplier to the T die 100 and an extrusion amount of the molten resin is quantitatively controlled by controlling a speed of the screw 111, or the screw driving motor 112.

An extrusion amount of the molten resin from the extruding machine 110 can be adjusted manually or automatically at a predetermined rate.

In some embodiments, the pressing load measurement means may be composed of pressure sensors 45R, 45L that measure a pressure of oil in the oil pressure cylinder devises 33R, 33L, instead of the load cells 43R, 43L.

The T die 100 discharges the molten resin to the roll gap between the first roll 11 and the second roll 12 from a lip portion thereof, which makes a melt bank MB above the roll gap between the first roll 11 and the second roll 12.

Then, since the first roll 11 and the third roll 13 are driven to rotate counterclockwise and the second roll 12 is driven to rotate clockwise, a sheet is obtained by such a way of a so-called touch-roll method, wherein the front face and the reverse face of the sheet S touch rolls respectively when passing through the roll gap between the first roll 11 and the second roll 12 and then the roll gap between the second roll 12 and the third roll 13.

There is provided a control device 50 of electrical control type employing a computer. The control device 50 includes a roll gap control section 51 that inputs a sensor signal (measurement data) from each of the displacement gauges 41R, 41L or 42R, 42L and the load cells 43R, 43L or the pressure sensors 45R, 45L to control the servo-motors 75R, 75L thereby to control the roll gap between the first roll 11 and the second roll 12, and a sheet take-off control section 52 that controls the electric motors 81, 82, 83 to control the sheet take-off speed.

The roll gap control section 51 can selectively execute one of two control modes provided therein: one is a constant roll gap control mode in which the roll gap is adjusted by the servo-motors 75R, 75L so that the roll gap between the first roll 11 and the second roll 12 measured by the displacement gauges 41R, 41L or 42r, 42L comes to have a predetermined target value; and the other is a constant pressing load control mode in which the roll gap is adjusted by the servo-motors 75R, 75L so that the pressing load to the first roll 11 which is measured by the load cells 43R, 43L or the pressure sensors 45R, 45L comes to have a predetermined target value.

The constant roll gap control mode is used to control the servo-motors 75R, 75L so that a deviation of a measurement value measured with regard to the roll gap between the first roll 11 and the second roll 12 by the displacement gauges 41R, 41L or 42R, 42L from a predetermined control target value of the roll gap becomes zero.

The constant pressing load control mode is used to control the servo-motors 75R, 75L so that a deviation of a measurement value measured with regard to a pressing load on the first roll 11 by the load cells 43R, 43L or the pressure sensors 45R, 45L from a predetermined target value of the pressing load becomes zero.

In this embodiment, the roll gap control section 51 controls the roll gap relying on the constant pressing load control mode, in the first place, at the time of or right after starting sheet forming or changing forming conditions. Then, once an extrusion amount from the extruding machine 110 reaches a predetermined target value and the roll gap measured by the displacement gauges 41R, 41L or 42R, 42L falls within the predetermined range for example, the control mode is switched from the constant pressing load control mode to the constant roll gap control mode.

The sheet take-off control section 52 controls a speed of the electric motors 81, 82, 83 in accordance with a deviation of the roll gap measured by the displacement gauges 41R, 41L or 42R, 42L from the predetermined value so as to control the sheet take-off speed. The above predetermined value of the roll gap may correspond to the control target value of the roll gap to be used in the constant roll gap control mode.

The higher the sheet take-off speed is, the thinner a sheet thickness becomes. Therefore, the sheet take-off speed control section 52 controls the sheet take-off speed so as to increase the speed when the roll gap becomes larger than the predetermined value due to an increase in the extrusion amount and to decrease the speed when the roll gap becomes narrower than the predetermined value.

Accordingly, when the roll gap is wider than the control target value, the sheet becomes thicker than the predetermined value, and thus the sheet thickness will be controlled to become thinner by increasing the sheet take-off speed. On the contrary, when the roll gap is narrower than the control target value, the sheet becomes thinner than the predetermined value, and thus the sheet thickness will be controlled to become thicker by decreasing the sheet take-off speed.

With such a control, the sheet take-off speed increases or decreases in accordance with an extrusion amount from the extruding machine 110, thereby enabling to maintain constant the sheet thickness and the size of the melt bank MB.

Figure 2:
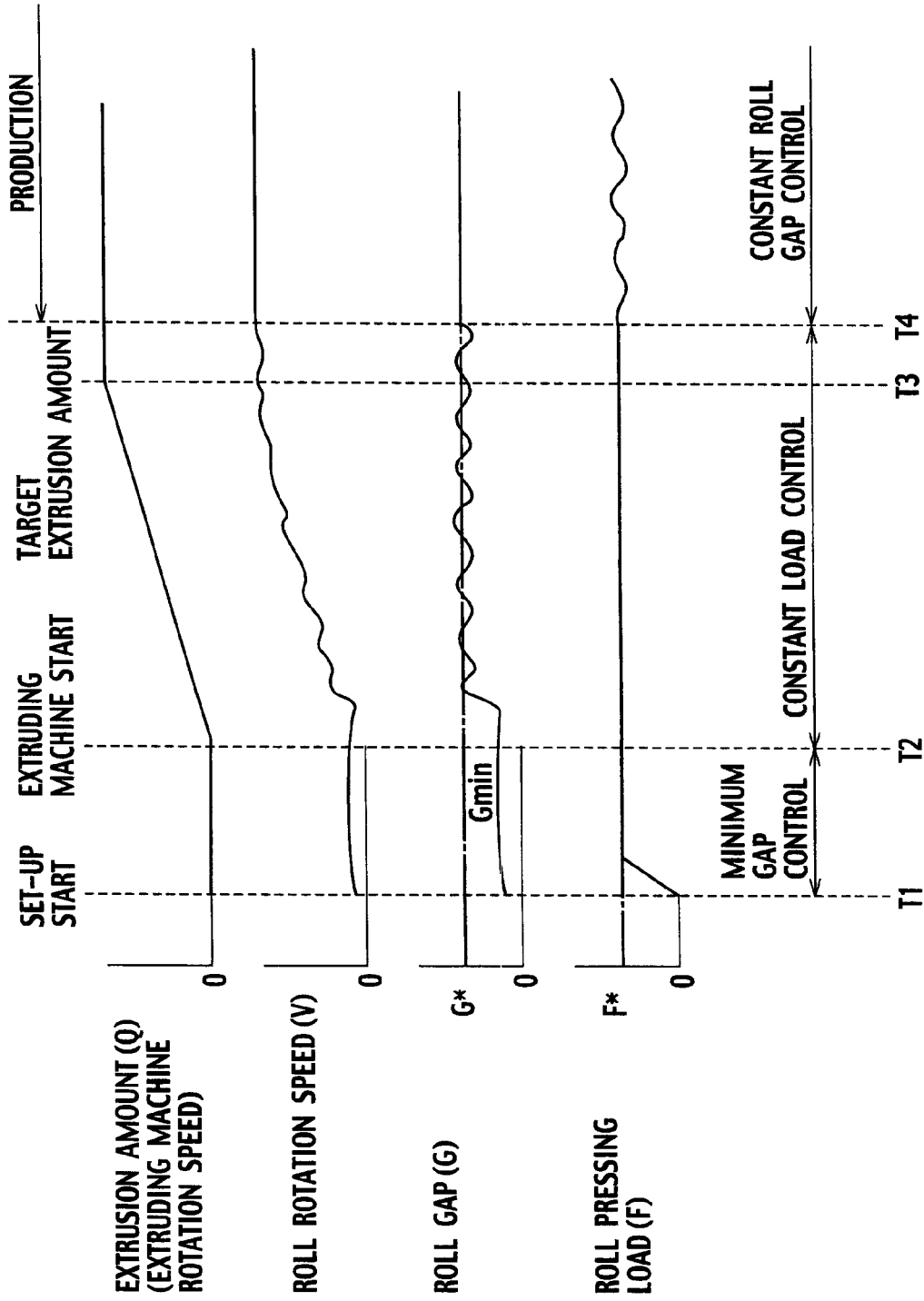
FIG. 2 is a time-chart for describing an operation procedure for the sheet forming apparatus according to the embodiment when the sheet forming is started.

Referring to a time-chart shown in FIG. 2, there will be described hereinafter a way of controlling the above-described sheet forming apparatus when the sheet forming is started.

Figure 3:
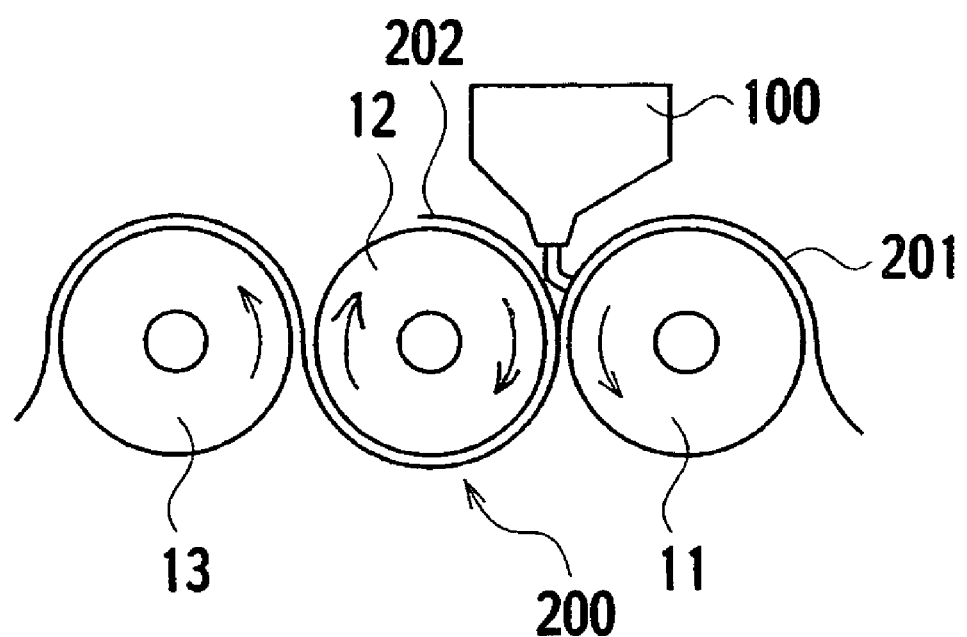
FIG. 3 is an explanatory view of a way of using a guide sheet at the time of starting the sheet forming.

At the time of T1, the sheet forming starts to be prepared. A guide sheet 200 is inserted to go through a sheet path line as shown in FIG. 3 in advance. The guide sheet 200 is composed of a sheet 201 and a sheet 202, made of cloth or heat-resistant film, wherein the leading end portion of the sheet 201 is affixed on a middle portion of the sheet 202 to form a Y-shape as a whole. The sheet 201 is hung around the first roll 11; and the leading end of the sheet 202 is hung around the second roll 12.

The roll gap is set as the minimum gap Gmin that is narrower than the target control value G* in the constant roll gap control and then the first roll 11, the second roll 12, and the third roll 13 are started to rotate at a creeping speed. The minimum gap Gmin is precisely set by abutting mechanical stoppers 28R, 28L and 29R, 29L provided in the bearing housings 24R, 24L and the bearing housing 16R, 16L. After the stoppers abut the housings, the pressing load is set as its target value F* and then the constant pressing load control is initiated.

At the time of T2, the extruding machine 110 starts to operate and the roll gap control section 51 starts to substantively carry out the constant pressing load control so as to maintain the pressing load to be the target control value F*. The extrusion amount Q of the molten resin by the extruding machine 110 is increased or decreased manually or automatically at a predetermined rate. The extrusion amount Q of the molten resin by the extruding machine 110 is adjusted by controlling a rotation rate of the screw in the extruding machine, a rotation rate of the gear pump, a supply amount of raw materials in the raw material supplying device or the like.

The target control value F* in the constant pressing load control is set as a smaller value than that determined at the time of sheet forming and increased when the extrusion amount Q increases to a certain degree. When the extrusion amount Q increases further and a temperature of the molten resin in the melt bank MB becomes higher, the target control value F* may be decreased. Alternatively, the target control value F* may be changed in accordance with a change in the extrusion amount when a relation between the extrusion amount and the pressing load has been determined in advance.

The molten resin from the extruding machine 110 is supplied to the T die 100 and then drops down therefrom, thereby being supplied to the gap between the first roll 11 and the second roll 12. At this time, this molten resin falls to a valley formed between the sheet 201 and the sheet 202 of the guide sheet 200. In other words, the molten resin is received by the guide sheet 200. Therefore, the molten resin is certainly prevented from falling below the rolls at the time of starting to supply the molten resin to the gap between the first roll 11 and the second roll 12. Then, the guide sheet 200 is removed downstream of the sheet path line by rotation of the first roll 11, the second roll 12, and the third roll 13.

During the constant pressing load control by the roll gap control section 51, the electric motors 81, 82, 83 are controlled so as to adjust the speed thereof in accordance with a deviation of a measurement value measured with regard to the roll gap by the displacement gauges 41R, 41L or 42R, 42L from the predetermined value of the roll gap, that is, the target control value G* to be used during in the constant roll gap control in this embodiment. This makes it possible to control the rotation speed V of the first roll 11, the second roll 12, and the third roll 13, thereby to control the sheet take-off speed.

This control of the sheet take-off speed is carried out in such a way that the speed is increased when the roll gap becomes wider than the predetermined value (the target control value G*) due to an increase in the extrusion amount Q and the speed is decreased when the roll gap becomes narrower than the predetermined value (the target control value G*).

Accordingly, when the extrusion amount is changed in this sheet forming, the roll gap and the sheet take-off speed are automatically adjusted, which makes it possible that an appropriate size of the melt bank is formed under an appropriate pressing load even when the sheet forming conditions are changed.

As a result, there will be eliminated long-existing disadvantages that a soft, less hardened sheet is separated apart below the rolls and falls down or that the melt bank grows so large as to cause surface defects on the sheet or overload on the roll driving motor. Therefore, operations including a set-up and an alteration of sheet forming conditions can easily be carried out.

At the time of T3, the extrusion amount Q from the extruding machine 110 reaches the target amount. Then, at the time of T4 when the roll gap G falls within a predetermined range, the control mode is switched from the constant pressing load control mode to the constant roll gap control mode. Subsequently, the sheet (product) S starts to be produced under the constant roll gap control mode. Switching from the constant pressing load control mode to the constant roll gap control mode need not necessarily be carried out according to the above-mentioned way but may be done depending on various conditions including time control or the like.

In the above embodiment, the pressure oil is served to or returned from the cylinder chambers 72, 73 of the oil pressure cylinder devices 33R, 33L by use of the two-way pumps 74R, 74L to be driven by the servo-motors 73R, 73L. However, the serving and returning of the pressure oil may be carried out by an electric servo valve. In addition, there can be employed a feed screw to be driven by a servomotor as another roll gap adjustment means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sheet forming apparatus equipped with two rolls arranged in parallel with each other leaving a gap therebetween, wherein a sheet having a front face and a back face goes through between the two rolls driven to rotate while the front face and the back face thereof are abutting the rolls, respectively, the apparatus comprising:

a roll position adjustment device adjusting the position of at least one of the two rolls thereby to increase or decrease a roll gap between the two rolls;

a roll position measurement device measuring a displacement of the roll position adjustment device or the position of the at least one roll adjusted by the roll position adjustment device, or both, to determine the roll gap between the two rolls;

a pressing load measurement device configured to measure a pressing load acting on at least one of the two rolls;

a roll position controller configured to perform a constant pressing load control in which the position of at least one of the two rolls is adjusted by the roll position adjustment device so that a deviation of a measurement value measured by the pressing load measurement device from a target control value of the pressing load becomes zero; and a sheet take-off speed controller controlling a sheet take-off speed of the sheet between the two rolls to maintain a constant sheet thickness based on measurements by the roll position measurement device under the constant pressing load control by the roll position controller.

2. The sheet forming apparatus of claim 1, wherein the roll position controller is configured to operate in two modes, a first mode being a constant pressing load control mode that performs the constant pressing load control and a second mode being a constant roll gap control mode that adjusts the position of at least one of the two rolls by use of the roll position adjustment device so that the roll gap between the two rolls reaches a predetermined target control value, wherein the roll gap is controlled by the first mode when starting of sheet forming or changing of forming conditions, and the control mode is switched to the second mode to control the roll gap when forming conditions conform to predetermined criteria.

3. A method of controlling a sheet forming apparatus equipped with two rolls arranged in parallel with each other leaving a gap therebetween, wherein a sheet having a front face and a back face goes through between the two rolls driven to rotate while the front face and the back face thereof are abutting the rolls, respectively, the method comprising:

adjusting a position of at least one of the two rolls;

measuring the position of at least one of the two rolls to determine a roll gap between the two rolls;

measuring a pressing load acting on the two rolls;

performing a constant pressing load control by adjusting the position of at least one of the two rolls so that the pressing load acting on the two rolls reaches a predetermined target control value; and controlling a sheet take-off speed of the sheet between the two rolls to maintain a constant sheet thickness based on measurement of the roll gap under the constant pressing load control.

4. A method of controlling a sheet forming apparatus equipped with two rolls arranged in parallel with each other leaving a gap therebetween, wherein a sheet having a front face and a back face goes through between the two rolls driven to rotate while the front face and the back face thereof are abutting the rolls, respectively, the method comprising:

adjusting a position of at least one of the two rolls;

measuring the positions of at least one of the two rolls to determine a roll gap between the two rolls;

measuring a pressing load acting on the two rolls;

performing a constant pressing load control by adjusting the positions of the two rolls so that a measurement value of the pressing load acting on the two rolls reaches a predetermined target control value and controlling a sheet take-off speed of the sheet between the two rolls to maintain a constant sheet thickness based on measurement of the roll gap under the constant pressing load control when starting sheet forming or changing forming conditions; and performing a constant roll gap control in which the position of at least one of the two rolls is adjusted so that the roll gap reaches a predetermined target control value when forming conditions conform to predetermined criteria.

5. The method of controlling a sheet forming apparatus of claim 4, wherein a relation between an extrusion amount of a molten resin from an extruding machine as a molten resin supplier and the pressing load in the constant pressing load control is determined in advance and a target control value of the pressing load in the constant pressing load control is in accordance with a change in the extrusion amount.

* * * * *